(12) United States Patent
Botha et al.

(10) Patent No.: US 7,931,886 B2
(45) Date of Patent: Apr. 26, 2011

(54) AGGLOMERATION OF TITANIA

(75) Inventors: Pieter Adriaan Botha, Hennopspark (ZA); Gert Hendrik Jacobus Coetzee, legal representative, Pretoria (ZA); Deon Bessinger, Midrand (ZA); Benjamin Alexander Dippenaar, Magalieskruin (ZA)

(73) Assignee: Kumba Resources Limited, Pretoria (ZA)

( * ) Notice: Subject to any disclaimer, the term of this patent is extended or adjusted under 35 U.S.C. 154(b) by 401 days.

(21) Appl. No.: 11/575,548

(22) PCT Filed: Sep. 14, 2005

(86) PCT No.: PCT/IB2005/053012
§ 371 (c)(1),
(2), (4) Date: Feb. 24, 2009

(87) PCT Pub. No.: WO2006/033051
PCT Pub. Date: Mar. 30, 2006

(65) Prior Publication Data
US 2009/0226365 A1    Sep. 10, 2009

(30) Foreign Application Priority Data
Sep. 21, 2004   (ZA) .................................. 2004/7574

(51) Int. Cl.
*C01G 23/047*   (2006.01)
*C22B 1/242*   (2006.01)

(52) U.S. Cl. .............. 423/610; 423/69; 423/71; 423/72; 423/74; 423/83; 423/594.1; 423/598; 423/633; 23/313 R; 23/314; 501/99; 501/134

(58) Field of Classification Search .............. 423/69, 423/71, 72, 74, 594.1, 598, 610, 633; 23/313 R, 23/314; 501/99, 134
See application file for complete search history.

(56) References Cited

U.S. PATENT DOCUMENTS

| | | | |
|---|---|---|---|
| 2,761,760 A | 9/1956 | Kamlet | |
| 3,359,065 A * | 12/1967 | Zirngibl et al. | 423/492 |
| 3,823,009 A | 7/1974 | Lailach et al. | |
| 3,977,863 A * | 8/1976 | Glaeser | 75/503 |
| 3,977,864 A * | 8/1976 | Glaeser | 75/437 |
| 4,078,039 A * | 3/1978 | Gueguin | 423/74 |
| 4,120,694 A | 10/1978 | Elger et al. | |
| 4,183,899 A * | 1/1980 | Bonsack | 75/437 |
| 4,187,117 A | 2/1980 | Gueguin | |
| 4,652,434 A | 3/1987 | Bonsack et al. | |
| 4,759,916 A * | 7/1988 | Heikel | 423/71 |
| 5,063,032 A * | 11/1991 | Gueguin | 423/84 |
| 6,149,712 A * | 11/2000 | Hall et al. | 75/767 |
| 6,803,024 B1 * | 10/2004 | Van Dyk et al. | 423/69 |

OTHER PUBLICATIONS

International Search Report issued by the International Bureau on Dec. 12, 2005, in connection with International Application No. PCT/IB2005/053012.

* cited by examiner

*Primary Examiner* — Timothy C Vanoy
*Assistant Examiner* — Diana J Liao
(74) *Attorney, Agent, or Firm* — Haynes and Boone, LLP

(57) ABSTRACT

According to the present invention there is provided a process for the agglomeration of titania slag particles comprising providing titania slag at a $d_{50}$ particle size of below 106 μm; mixing the slag particles with an organic binder; and agglomerating the mixture of the slag particles and organic binder into agglomerated particles with a $d_{50}$ particle size in the range from 106 μm to 1000 μm. The agglomerated particles have a ($TiO_2$ and FeO)/C mass ratio of more than 3.4. The invention also relates to such agglomated slag particles and a chloride process for the production of $TiO_2$ wherein such agglomerated titania slag particles are used.

25 Claims, No Drawings

AGGLOMERATION OF TITANIA

FIELD OF THE INVENTION

This invention relates to the agglomeration of titania slag.

BACKGROUND ART

Titanium is widely known for its use as a metal, but the primary use of titanium is in the form of titanium dioxide ($TiO_2$). $TiO_2$ is used as a white pigment in paints, plastics and paper.

There are two commercial processes for the production of $TiO_2$ pigment namely, the sulphate process and the chloride process. The sulphate process comprises dissolving the feedstock in the form of titanium ore (such as ilmenite) or titania slag in concentrated sulphuric acid. The liquid containing dissolved $TiO_2$ is then subjected to hydrolysis to yield solid $TiO_2$. In the chloride process, the feedstock in the form of titanium ore or titania slag is fluidized at a high temperature (for example 950-1200° C.) in chlorine gas to produce a gas including $TiCl_4$. The $TiCl_4$ is then selectively condensed from the gas and is mixed with oxygen at high temperatures to yield $TiO_2$.

A sulphate process plant is easier to operate and monitor than a chloride process plant, and is capable of using feedstock with a relatively low $TiO_2$ content.

However, capital costs of a modern sulphate process plant can be higher than that of a chloride process plant of the same pigment capacity. Furthermore there is a higher volume of waste products to be treated and disposed of due to the use of more impure feedstock and the fact that the sulphate used In the process cannot be easily recovered and recycled. Accordingly the chloride process is a more favourable process and is growing in popularity.

One of the requirements of the chloride process is that the particle size specification of the feedstock must be suitable for use In a fluidized bed reactor. This particle size is typically in the range of 106 μm to 850 μm±5% (by mass).

As mentioned above the feedstock is either titanium ore or titania slag. In recent developments titania slags are upgraded and the upgraded slag is then used as a feedstock.

Titania slag is generally produced by reduction of ilmenite ores in an electric arc furnace to form pig iron and titania rich slag. The titania rich slag so formed is cast in a molten state into ladles whereby solid blocks are produced ranging from a few tons to as much as forty tons. After cooling, these blocks are crushed and then milled down to a particle size in the range of 106 to 850 μm rendering it suitable for use in the chloride process. It has been found that during this milling process some of the slag is reduced to a particle size below 106 μm rendering it too fine for use in the chloride process.

Agglomeration of titania slags is known in the art. U.S. Pat. No. 2,723,903 discloses a process wherein a densified, briquetted mixture of titaniferous material (including Sorel type slag containing approximately 70% by mass $TiO_2$), coking coal (some non-coking coal can also be added) and a carbonaceous binding agent is chlorinated in a shaft furnace. Briquettes were produced with dimensions of 50.8 mm by 50.8 mm by 31.8 mm. The briquettes as exemplified had an estimated $TiO_2$ and FeO/C mass ratio of 0.7 to 1.3.

U.S. Pat. No. 2,805,120 discloses a similar process as in U.S. Pat. No. 2,723,903.

U.S. Pat. Nos. 4,117,076 and 4,187,117 disclose pelletised Sorel slag with bituminous coking coal and a suitable binder. The pellets were of a suitable size to be used in a fluidized bed reactor. These pellets again had a high carbon content and the pellets exemplified typically had a ($TiO_2$ and FeO)/C mass ratio of between 2 and 3.2.

It is known that the coal used in the briquettes and pellets described above serve as a binder and a reductant. One disadvantage of using coal In agglomerates can be a decrease in strength if a coal with a high volatile content is used.

The present inventors have now developed an economically viable process for the agglomeration of titania slag particles smaller than 106 μm thereby rendering it suitable to be used in the chloride process. It has been found that the carbon content in the agglomerates can be reduced and still provide agglomerates with a suitable strength.

DESCRIPTION OF THE INVENTION

According to the present invention a process for the agglomeration of titania slag particles comprises
  providing titania slag at a $d_{50}$ particle size of below 106 μm;
  mixing the slag particles with an organic binder; and
  agglomerating the mixture of the slag particles and organic binder into agglomerated particles with a $d_{50}$ particle size in the range from 106 μm to 1000 μm and the agglomerated particles having a ($TiO_2$ and FeO)/C mass ratio of more than 3.4.

The titania slag may be any suitable titania slag, but preferably it comprises slag fines with a particle size below 200 μm and preferably with a $TiO_2$ content of above 70% (by mass), preferably above 75% (by mass), and more preferably above 80% by mass. The titania slag may have a composition rendering it suitable to be used in a fluidized bed reactor of a chloride process for producing $TiO_2$. Alternatively, the titania slag may be treated to render the slag suitable for use in the said chloride process. In one embodiment of the Invention the titania slag may be treated to remove unwanted compounds and preferably increasing the titanium concentration of the slag. In one embodiment of the invention the titania slag may be subjected to magnetic separation to remove unwanted compounds. This treatment may take place before or subsequent to the sizing described below.

If CaO is present In the slag, it is preferably present at below 0.5% by mass, preferably below 0.3% by mass. If MgO is present in the slag it is preferably present at below 3% by mass, preferably below 1.2% by mass.

The slag may be slag derived from beach sand ilmenite.

The process may also include a step of sizing the titania slag to a $d_{50}$ particle size below 106 μm. The sizing of the titania slag may be by any conventional method. Screening may, for example, be considered. Preferably the titania slag is comminuted, more preferably the titania slag is milled. Preferably a ball mill, preferably a dry ball mill is used for milling the titania slag.

Preferably the slag has a $d_{80}$ particle size of smaller than 75 μm, preferably a $d_{50}$ particle size of smaller than 40 μm. Preferably the $d_{50}$ particle size is 20 μm or 17 μm or even smaller. It is believed that the finer the particle size, the better the agglomeration will be.

Any suitable organic binder may be used. The organic binder may be selected from the group consisting of a cellulose product; a dairy waste product (such as lactose and whey products); a natural gum (such as guar gum); a starch product (such as corn, potato and wheat starches); a starch acrylic copolymer; a wood related product (such as hemicellulose) and a mixture of one or more thereof. Preferably the binder comprises starch, preferably gelled starch and more preferably gelled corn starch. It has been found that the starch not only provides sufficient binding strength, but the use thereof also does not result in unacceptable contamination of the agglomerated product.

The titania slag and binder may be mixed in any suitable ratio. In the case of a starch binder, 1 to 5% (by mass) starch may be added. Preferably 2 to 3% (by mass) of starch is added and more preferably about 2.5% (by mass) starch is added.

The titania slag and binder may be mixed in any suitable manner. In one embodiment of the invention the binder may be added during the process of sizing of the slag thereby to obtain mixing of the binder and the slag. In another embodiment of the invention any suitable mixer, e.g. a high rate mixer can be used to obtain mixing of the already sized slag and the binder.

As moisture content plays an important role in agglomeration, steps can be taken to obtain the desired moisture level prior to agglomeration. The moisture content prior to agglomeration may be 1 to 8% (by mass). Steps can be taken to adjust the moisture content upwardly.

The mixture of sized slag and binder may be agglomerated in any suitable manner. Preferably said mixture is pelletised. The pelletising may be by any suitable manner, but preferably a disc pelletiser is used.

Preferably water is added during the pelletising process. The amount of water added is suitable to obtain acceptable pelletising.

Preferably at least 60% (by mass), preferably at least 75% (by mass), preferably at least 90% (by mass) of the agglomerated particles are in the size range of 106 to 1000 µm, preferably in the range of 106 to 850 µm. In the preferred embodiment of the invention the $d_{50}$ particle size of the agglomerated particles is In the range of 150 to 1000 µm, preferably 150 to 850 µm.

The ($TiO_2$ and FeO)/C mass ratio is preferably above 4, more preferably above 5, and more preferably above 10. It is foreseen that a suitable reductant such as carbon (for example) may be incorporated into the agglomerated product, but even then the above ratios are valid. In a preferred embodiment of the invention the ($TiO_2$ and FeO)/C mass ratio is preferably at least 20, preferably at least 25, preferably above 40 and even above 80.

Preferably the agglomerated particles have a density of above 1 g/cm$^3$, preferably above 1.1 g/cm$^3$, preferably above 1.2 g/cm$^3$ and more preferably above 1.3 g/cm$^3$.

The agglomerated particles/pellets formed may be subjected to heat treatment. In one embodiment of the invention the agglomerated particles/pellets may be merely dried, for example at 60° C. Alternatively the pellets may be treated at higher temperatures, typically at about 160° C. or 200° C. and even 250° C. to obtain drying and hardening of the pellets.

The pellets may also be sized to fall in a range of 106-850 µm. The oversized pellets (+850 µm) and the undersized pellets (−106 µm) may be recycled.

The pellets or agglomerates so formed may be suitable to be used in the chloride process for the production of $TiO_2$ which process includes a fluidized bed reactor. According to another aspect of the present invention there is provided agglomerated titania slag particles having agglomerated particles with a $d_{50}$ particle size in the range of 106 to 1000 µm, and the agglomerated particles having a ($TiO_2$ and FeO)/C mass ratio of more than 3.4. Preferably it comprises pelletised titania slag particles. Preferably the agglomerated particles are prepared by the process substantially described hereinabove.

According to another aspect of the present invention there is provided a chloride process for the production of $TiO_2$ wherein agglomerated titania slag particles as described above is used. The chloride process may include the steps of:
  providing agglomerated titania slag particles substantially as described hereinabove;
  feeding the agglomerated titania slag with a reductant and chlorine gas into a fluidized bed reactor to produce gaseous titanium tetrachloride;
  condensing the gaseous titanium tetrachloride; and
  oxidizing the condensed titanium tetrachloride to form $TiO_2$.

The agglomerated titania slag may be prepared by the process substantially as described herein above. The fluidized bed reactor may be operated at an elevated temperature, typically in the order of 900 to 1200° C. A suitable reductant may be a carbonaceous product. The reductant may be incorporated into the agglomerated titania slag. Alternatively, it may be separately provided for. The gaseous titanium tetrachloride produced in the fluidized bed reactor is part of a gas stream also containing a number of other chloride products. The said gas stream is usually cooled as it leaves the fluidized bed reactor and is then condensed. Separation of the titanium tetrachloride product from the other chloride products (such as iron chlorides) is possible due to differences in boiling points of the various chloride products. The separated titanium tetrachloride may be cooled and may be cleaned before being oxidized to form $TiO_2$. The $TiO_2$ so formed may then be further processed to produce the final pigment product.

The invention will now be further described by means of the following non-limiting examples.

EXAMPLE 1

Three different sized slag fines products were obtained from a single high titania slag bulk sample (slag derived from beach sand ilmenite) for pelletisation test work. The first sample (SF1) was milled in a ball mill to a $d_{50}$ of 17 µm. The second sample (SF2) was screened on a 106 µm sieve, with the −106 µm size fraction used for pelletisation test work. The $d_{50}$ of this sample was 62 µm. The third sample (SF3) was representative of the bulk sample and was used as received. The $d_{50}$ of this sample was 126 µm. A typical chemical composition of the bulk sample is given below (Table 1):

TABLE 1

| $SiO_2$ (%) | $Al_2O_3$ (%) | $Fe_{Total}$ (%) | $TiO_2$ (%) | CaO (%) | MgO (%) | MnO (%) | $Cr_2O_3$ (%) | $V_2O_5$ (%) |
|---|---|---|---|---|---|---|---|---|
| 2.52 | 1.27 | 8.63 | 85.2 | 0.25 | 1.08 | 2.00 | 0.16 | 0.37 |

% are mass %

Gelled corn starch was used as binder in all the pelletisation tests. For each of the tests, samples were mixed with the binder in a high intensity mixer prior to the pelletising step. A disk pelletiser (1.2 m diameter) was used for the pelletising of the different mixtures. During the pelletisation step sufficient water was added to each mixture to ensure the production of the required pellets. The pellets produced in this way were dried overnight at 60° C. From each of the tests a −3+1 mm fraction was screened out and used for the physical strength determinations of the pellets. For the determination of the micro-pellet strength, 500 g of the −3+1 mm fraction was used. This sample was then sieved on an orbital shaker for 4 minutes and the amount of −0.5 mm material determined. This was used as a quantitative measurement for the cold strength of the pellets. Samples from each test (−3+1 mm pellets) were also subjected to high temperature shock tests at 1100° C. in a muffle furnace to simulate the breakdown of the pellets during loading conditions into a furnace. After the shock tests the samples were again subjected to a screening test at 0.5 mm for 2 minutes to determine the extent of the breakdown of the pellets. The high temperature shock tests were carried out in air and nitrogen atmospheres. The results of the pelletisation tests on the milled slag fines (sample SF1) are shown in Table 2. These results show that a binder addition of approximately 2 to 4% gave the best results regarding the cold strength and high temperature shock test properties of the pellets.

TABLE 2

| | | | | | Pellet properties | |
|---|---|---|---|---|---|---|
| | Pellet feed mixture | | | Cold strength: | High temperature shock tests: Pellets heated to 1100° C. in | High temperature shock tests: Pellets heated |
| Slag fines - sample SF1 (kg) | Binder (kg) | Binder addition (%) | Calc $(TiO_2 + FeO)/C$ mass ratio | Air dried pellets screened at −0.5 mm (%) | nitrogen for 2 min and then screened at −0.5 mm (%) | to 1100° C. in air for 2 min and then screened at −0.5 mm (%) |
| 5.00 | 0.051 | 1.01 | 100 | 7.2 | 1.1 | 1.3 |
| 5.00 | 0.102 | 2.04 | 50 | 0.8 | 1.8 | 1.4 |
| 5.00 | 0.155 | 3.09 | 33 | 0.6 | 1.6 | 1.4 |
| 5.00 | 0.208 | 4.17 | 25 | 0.8 | 2.8 | 0.9 |
| 5.00 | 0.263 | 5.26 | 20 | 1.4 | 4.6 | 4.6 |

% are mass %

In addition to these tests, similar tests were carried out on the different size fractions of the milled slag (samples SF1, SF2 and SF3). These tests were carried out with a binder addition of 2.56% by mass. The results of these tests are shown in Table 3. These results show that milling of the slag is preferred to obtain pellets with sufficient high temperature strength.

TABLE 3

| | | | | | Pellet properties | |
|---|---|---|---|---|---|---|
| | Pellet feed mixture | | | Cold strength: Air dried | High temperature shock tests: Pellets heated to 1100° C. in nitrogen for 2 min | High temperature shock tests: Pellets heated to 1100° C. in air |
| Slag sample | Slag (kg) | Binder (kg) | Binder addition (%) | pellets screened at −0.5 mm (%) | and then screened at −0.5 mm (%) | for 2 min and then screened at −0.5 mm (%) |
| SF1 | 5.00 | 0.1282 | 2.56 | 1.0 | 4.0 | 3.0 |
| SF2 | 5.00 | 0.1282 | 2.56 | 2.9 | 42.7 | 46.6 |
| SF3 | 5.00 | 0.1282 | 2.56 | 1.8 | 49.5 | 58.4 |

% are mass %

The carbon content of pellets produced in this way is typically in the order of 1% by mass. This results in a calculated $(TiO_2$ and $FeO)/C$ mass ratio of approximately 85.

EXAMPLE 2

Titania slag fines ($d_{50}$ of 125 μm) were milled to a $d_{50}$ of 17 μm (sample SF1 from example 1). These milled fines were than agglomerated in a disk pelletiser, using a gelled corn starch as binder (binder addition of 2.56% by mass). During the agglomeration process sufficient water was added to assist with the agglomeration process. After agglomeration, the product was dried overnight at 60° C. A −850+106 μm size fraction of the dried agglomerated product was then used for chlorination test work. The agglomerated product had a bulk density of 1.41 g/cm³ and the $(TiO_2$ and $FeO)/C$ mass ration was again approximately 85.

The composition of the agglomerated product after drying was as follows (Table 4):

TABLE 4

| SiO$_2$ (%) | Al$_2$O$_3$ (%) | Fe$_{Total}$ (%) | TiO$_2$ (%) | CaO (%) | MgO (%) | MnO (%) | Cr$_2$O$_3$ (%) | V$_2$O$_5$ (%) | C (%) |
|---|---|---|---|---|---|---|---|---|---|
| 2.45 | 1.20 | 8.45 | 82.5 | 0.17 | 0.94 | 1.88 | 0.15 | 0.37 | 1.12 |

% are mass %

Chlorination of the agglomerated product was carried out in an externally heated fluidised bed reactor (inner diameter of 50 mm). Nitrogen (6.5 l per minute) was used to fluidise the agglomerated sample (20 g) while the reactor was heated to 1000° C. As the temperature reached 1000° C., CO (2.8 l per minute) and Cl$_2$ (4.0 l per minute) gases were introduced into the reactor in addition to the nitrogen. The product gases were cooled in a water-cooled condenser. Chloride products and excess chlorine gas were absorbed in sodium hydroxide solutions. The reaction was allowed to continue for 15 minutes, after which the CO and Cl$_2$ gas flows were discontinued and the furnace power switched off. The fluidised bed reactor was flushed with nitrogen for 5 minutes, after which the residue was removed from the reactor. The composition of the residue was as follows (Table 5):

TABLE 5

| SiO$_2$ (%) | Al$_2$O$_3$ (%) | Fe$_{Total}$ (%) | TiO$_2$ (%) | CaO (%) | MgO (%) | MnO (%) | Cr$_2$O$_3$ (%) | V$_2$O$_5$ (%) | C (%) |
|---|---|---|---|---|---|---|---|---|---|
| 3.13 | 1.02 | 0.11 | 95.3 | 0.19 | 0.24 | 0.06 | 0.04 | 0.02 | 0.004 |

% are mass %

Inspection of the residue revealed that the color of the agglomerated particles had changed from black to off-white. It was also noted that the agglomerated particles had maintained their integrity and had not broken up into fines, indicating the suitability of the agglomerated product as feedstock for chlorination.

EXAMPLE 3

High titania slag fines derived from beach sand ilmenite (analyses similar to that of Example 1, Table 1; 80% by mass of slag −75 μm) were subjected to pelletising tests using various types of organic binders. The following binders were used:

Gelled corn starch

Peridur (a carboxyl methyl cellulose product) (Peridur is a trade name and it is supplied by Akso Nobel).

In each instance slag fines (2.5 kg) were mixed with the binder in a high intensity mixer prior to the pelletising step. A disk pelletiser was used for the pelletising of the materials. The produced micro-pellets were dried overnight at 60° C. From each of the tests a −1+0.5 mm fraction (500 g) was screened out. This sample was then sieved for 4 minutes on an orbital shaker and the amount of −0.5 mm material determined. This was used as a quantitative measurement for the cold strength of the pellets. The results of these tests are shown in Table 6.

TABLE 6

| Binder | Binder addition (% by mass) | Cold strength: Air dried pellets screened at −0.5 mm |
|---|---|---|
| Starch | 2.00 | 1.56 |
| Peridur | 1.00 | 1.54 |

It was noted that the starch as well as the Peridur gave overall binding properties to the pellets (cold strength values similar). Physical binding during the ball formation was easier with the starch as binder if compared to the pellets where Peridur was used as a binder.

EXAMPLE 4

This example illustrates the chlorination behaviour of agglomerated titania slag (pellets) with that of slag milled to a −850+106 μm size fraction (chloride grade slag)

Titania slag fines (d$_{50}$ of 125 μm) derived from beach sand ilmenite were milled to a d$_{50}$ of 20 μm. These milled fines were then agglomerated in a disk pelletiser, using gelled corn starch as binder (binder addition of 2.56% by mass). During the agglomeration process sufficient water was added to assist with the agglomeration process. After agglomeration, the product was dried overnight at 60° C. A −1+0.5 mm size fraction of the dried agglomerated product was then used for chlorination test work. The d$_{50}$ of the agglomerated product was measured at 690 μm, while the product had a bulk density of 1.47 g/cm$^3$. The (TiO$_2$ and FeO)/C mass ratio was 114. The composition of the agglomerated product after drying was as follows (Table 7):

TABLE 7

| SiO$_2$ (%) | Al$_2$O$_3$ (%) | Fe$_{Total}$ (%) | TiO$_2$ (%) | CaO (%) | MgO (%) | MnO (%) | Cr$_2$O$_3$ (%) | V$_2$O$_5$ (%) | C (%) |
|---|---|---|---|---|---|---|---|---|---|
| 2.54 | 1.21 | 8.3 | 81.4 | 0.12 | 0.94 | 1.79 | 0.22 | 0.44 | 0.81 |

% are mass %

Titania slag was milled down to a −850+106 μm size fraction. The d$_{50}$ of this sample was measured as being 370 μm, with a bulk density of 2.03 g/cm$^3$. The composition of this sample was as follows (Table 8):

agglomerating the mixture of the slag particles and organic binder into agglomerated particles with a d$_{50}$ particle size in the range from 106 μm to 1000 μm, and the

TABLE 8

| SiO$_2$ (%) | Al$_2$O$_3$ (%) | Fe$_{Total}$ (%) | TiO$_2$ (%) | CaO (%) | MgO (%) | MnO (%) | Cr$_2$O$_3$ (%) | V$_2$O$_5$ (%) | C (%) |
|---|---|---|---|---|---|---|---|---|---|
| 2.12 | 1.26 | 7.5 | 85.2 | 0.12 | 0.97 | 1.75 | 0.22 | 0.46 | 0.03 |

% are mass %

Chlorination of these products were carried out in a quartz tube (27 mm diameter). A porous frit supported the bed of sample, consisting of a mix of one of the slag samples together with a carbonaceous reductant (Sascarb LS). Tests were carried out by placing the charge (40 g of slag sample and 8 g of Sascarb LS) in the reactor. Nitrogen was run through the reactor during the period it took to reach the reaction temperature of 1200° C. When the bed reached 1200° C. chlorine was Introduced in addition to the nitrogen. After completion of the test the bed was cooled in nitrogen.

Comparative chlorination results for the slag pellets and chloride grade slag are shown In Table 9. Table 9 shows the fraction of FeO and TiO$_2$ removed from the reactor bed. FeO chlorinates rapidly, while the chlorination of TiO$_2$ in the samples is slower. These results show that the rate of chlorination between the two samples is similar.

TABLE 9

| Type of material | Time reacted | Fraction TiO$_2$ reacted | Fraction FeO reacted |
|---|---|---|---|
| Slag pellets | 0 | 0.00 | 0.00 |
|  | 20 | 0.31 | 0.99 |
|  | 40 | 0.57 | 0.99 |
|  | 60 | 0.53 | 0.99 |
|  | 90 | 0.88 | 1.00 |
| Chloride grade slag | 0 | 0.00 | 0.00 |
|  | 15.4 | 0.46 | 0.99 |
|  | 40 | 0.70 | 1.00 |
|  | 60 | 0.72 | 1.00 |
|  | 90 | 0.71 | 1.00 |

The d$_{50}$ of the slag remaining in the bed after chlorination was also measured. For the slag pellets the d$_{50}$ after chlorination for all the tests ranged between 400 and 700 μm, indicating that minimal breakdown of the pellets occurred during the chlorination process. For the chloride grade slag the typical d$_{50}$ after chlorination was 300 to 400 μm, indicating minimal breakdown of the chloride grade slag.

It is concluded from these results that slag pellets can be used as a substitute for chloride grade slag.

The invention claimed is:

1. A process for the agglomeration of titania slag particles comprising:
   providing titania slag at a d$_{50}$ particle size of below 106 μm;
   mixing the slag particles with an organic binder; and
   agglomerated particles having a (TiO$_2$ and FeO)/C mass ratio of more than 3.4.

2. The process of claim 1 wherein the titania slag has a TiO$_2$ content above 75% (by mass).

3. The process of claim 1 wherein the slag is slag derived from beach sand ilmenite.

4. The process of claim 1, further comprising sizing the titania slag to a d$_{50}$ particle size below 106 μm.

5. The process of claim 4 wherein the sizing is by means of milling.

6. The process of claim 1 wherein the slag has a d$_{50}$ particle size of smaller than 40 μm.

7. The process of claim 1 wherein the organic binder is selected from a cellulose product; a dairy waste product; a natural gum; a starch product; a starch acrylic copolymer; a wood related product and a mixture of one or more thereof.

8. The process of claim 7 wherein the binder is gelled corn starch.

9. The process of claim 8 wherein the titania slag and the gelled corn starch are mixed to contain 1 to 5% (by mass) of the gelled corn starch.

10. The process of claim 1 wherein the agglomerating comprises pelletizing.

11. The process of claim 1 wherein the d$_{50}$ particle size of the aggolomerated particles is in the range of 150 μm to 1000 μm.

12. The process of claim 1 wherein the (TiO$_2$ and FeO)/C mass ratio is above 4.

13. The process of claim 12 wherein the (TiO$_2$ and FeO)/C mass ratio is at least 20.

14. The process of claim 13 wherein the (TiO$_2$ and FeO)/C mass ratio is above 40.

15. The process of claim 1, further comprising subjecting the agglomerated particles formed to heat treatment.

16. Agglomerated titania slag particles having agglomerated particles with a $d_{50}$ particle size in the range of 106 μm to 1000 μm, and the agglomerated particles having a ($TiO_2$ and FeO)/C mass ratio of more than 3.4.

17. A process using agglomerated titania slag particles comprising:
providing agglomerated titania slag particles having a $d_{50}$ particle size in the range of 106 μm to 1000 μm, and the agglomerated particles having a ($TiO_2$ and FeO)/C mass ratio of more than 3.4;
feeding the agglomerated titania slag particles with a reductant and chlorine gas into a fluidized bed reactor to produce gaseous titanium tetrachloride;
condensing the gaseous titanium tetrachloride; and
oxidizing the condensed titanium tetrachloride to form $TiO_2$.

18. The process of claim 17, further comprising:
forming the agglomerated titania slag particles by:
providing titania slag at a $d_{50}$ particle size of below 106 μm;
mixing the slag particles with an organic binder; and
agglomerating the mixture of the slag particles and organic binder into agglomerated particles with a $d_{50}$ particle size in the range from 106 μm to 1000 μm, and the agglomerated particles having a ($TiO_2$ and FeO)/C mass ratio of more than 3.4.

19. The process of claim 17 wherein the $d_{50}$ particle size of the aggolomerated particles is in the range of 150 μm to 1000 μm.

20. The process of claim 17 wherein the ($TiO_2$ and FeO)/C mass ratio is above 4.

21. The process of claim 20 wherein the ($TiO_2$ and FeO)/C mass ratio is at least 20.

22. The process of claim 21 wherein the ($TiO_2$ and FeO)/C mass ratio is above 40.

23. The process of claim 18 wherein the titania slag has a $TiO_2$ content above 75% (by mass).

24. The process of claim 18 wherein the titania slag has a $d_{50}$ particle size of smaller than 40 μm.

25. The process of claim 18, further comprising subjecting the agglomerated particles formed to heat treatment.

* * * * *

UNITED STATES PATENT AND TRADEMARK OFFICE
CERTIFICATE OF CORRECTION

| | | |
|---|---|---|
| PATENT NO. | : 7,931,886 B2 | Page 1 of 1 |
| APPLICATION NO. | : 11/575548 | |
| DATED | : April 26, 2011 | |
| INVENTOR(S) | : Pieter Adriaan Botha et al. | |

It is certified that error appears in the above-identified patent and that said Letters Patent is hereby corrected as shown below:

Column 1, line 33, change "In" to -- in --;
        line 40, change "In" to -- in --.

Column 2, line 7, change "In" to -- in --;
        line 35, change "Invention" to -- invention --.

Column 3, line 33, change "In" to -- in --.

Column 9, lines 13-17, delete "agglomerating the mixture of the slag particles and organic binder into agglomerated particles with a $d_{50}$ particle size in the range from 106 μm to 1000 μm, and the".

Column 10, claim 1, line 35, after "and" insert -- agglomerating the mixture of the slag particles and organic binder into agglomerated particles with a $d_{50}$ particle size in the range from 106 μm to 1000 μm, and the --.

Signed and Sealed this
Fifth Day of July, 2011

David J. Kappos
*Director of the United States Patent and Trademark Office*